United States Patent [19]

Smith et al.

[11] 4,297,120
[45] Oct. 27, 1981

[54] GLASS BENDING TABLE

[76] Inventors: Robert J. Smith, S. 1215 Mica Park Dr., Spokane, Wash. 99206; Mark A. Smith; Michael E. Jensen, both of S. 1922 Bannen, Veradale, Wash. 99216; Robert L. Smith, N. 3950 McGuire Rd., Post Falls, Id. 83854

[21] Appl. No.: 172,994

[22] Filed: Jul. 28, 1980

[51] Int. Cl.³ .............................................. C03B 23/06
[52] U.S. Cl. ........................................ 65/281; 65/103; 65/108; 65/292; 264/285; 264/339
[58] Field of Search ................. 65/103, 108, 281, 292; 264/285, 339

[56] References Cited

U.S. PATENT DOCUMENTS

| | | | |
|---|---|---|---|
| 1,763,071 | 6/1930 | Smalley | 65/108 X |
| 1,879,411 | 9/1932 | Morrison | 65/292 |
| 1,923,148 | 8/1933 | Hotchner | 65/108 |
| 2,064,039 | 12/1936 | Shively et al. | 65/108 |
| 2,778,161 | 1/1957 | Zaphiropoulos | 65/292 |
| 3,309,187 | 3/1967 | Drangeid | 65/103 |

*Primary Examiner*—Arthur D. Kellogg
*Attorney, Agent, or Firm*—Wells, St. John & Roberts

[57] ABSTRACT

A pattern table for forming of heated glass tubing such as neon light tubing according to a prescribed flat pattern. The table includes three support surfaces: a first for holding the pattern; a second light transmitting plate held directly over the pattern; and a third light transmitting screen supported on a top surface of the plate. Heated glass tubing can rest against the screen and be formed according to a pattern viewed through the screen and glass plate. The pattern is insulated from the heated glass tubing being formed. The heated glass tubing in turn is isolated from the heat absorbing glass plate by an interposed air space within the screen structure.

10 Claims, 3 Drawing Figures

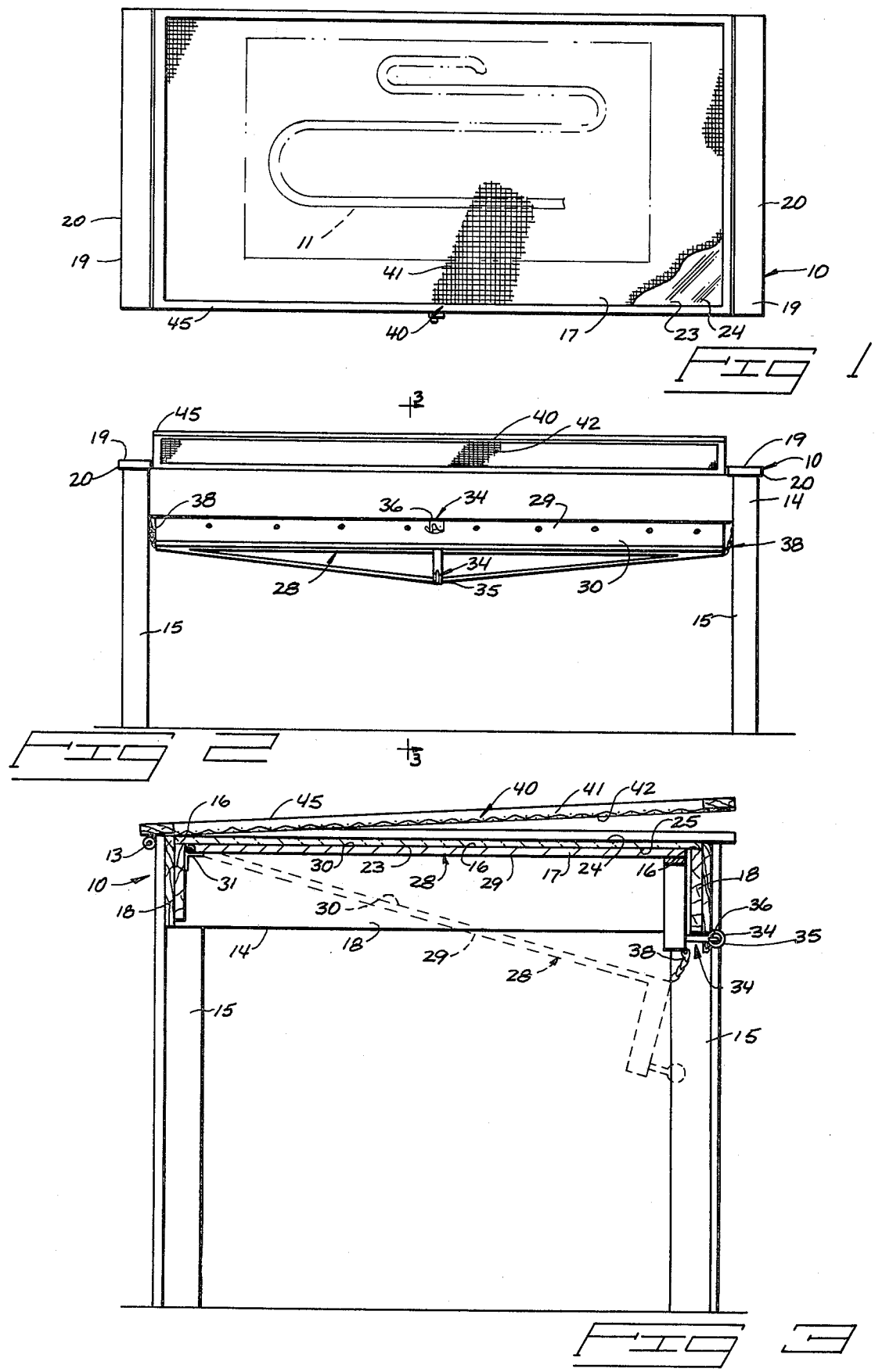

GLASS BENDING TABLE

BACKGROUND OF THE INVENTION

The present invention relates to tables facilitating formation of heated glass according to a flat pattern.

Bending of heated glass for various purposes is a highly skilled trade. This is especially true for example in the neon sign producing industry. There, exacting flat patterns are precisely followed by a highly skilled tube lender. The bending process begins with a straight piece of glass tubing, heated at selected areas where bends are to be formed. The glass tubing must be heated until it is sufficiently flexible enough to allow formation of the necessary bend. The tube bender makes the appropriate bend and places the tube on the pattern to assure that the bend was properly made. These steps are repeated until the project is complete.

Because of the elevated temperature of the heated tube, the patterns have had to be made from a heat resistant material. Asbestos paper has been in predominant use by tube benders for this purpose. Asbestos, however, is now commonly known to cause asbestosis, a disease that has severely affected the tube bending trade. In fact, legislation has been recently passed forbidding the sale of asbestos. No more asbestos paper can now be produced.

Patterns made on ordinary paper are useful (if at all) only once due to burn marks left on the paper surface by heated glass. Other alternatives to ordinary paper are either impractical or too expensive.

The problem now confronted by the neon sign industry and others using bent glass is how to preserve forming patterns for future reuse.

The present invention provides a table on which ordinary paper patterns can be used. The patterns are insulated from the heated glass on a table structure presenting a surface for support of formed, heated glass. The pattern is not subjected to either heat or frictional wear and will therefore last at least as long as previously used asbestos paper, without any health hazard to the tube bender. Additionally, the heated glass is supported on a surface of the table that will not substantially conduct heat from the heated glass, thereby allowing even, uniform cooling of the hot tubing sections.

BRIEF DESCRIPTION OF THE DRAWINGS

FIG. 1 is a plan view of the present table showing a forming pattern in dashed lines thereon;

FIG. 2 is a front elevation view of the table with the screen lifted and the pattern support panel lowered; and FIG. 3 is an enlarged sectional view taken along line 3—3 in FIG. 2, showing a raised, operative position of the pattern support panel in solid lines, and a lowered inoperative position by dashed lines.

DETAILED DESCRIPTION OF A PREFERRED EMBODIMENT

The present table is generally indicated by the reference numeral 10. It was developed for insulating a flat pattern 11 from heated glass tubing while providing a surface upon which the heated glass tubing can be supported. The term "glass tubing" as used herein is to be taken broadly as meaning practically any form of heated glass that can be formed according to a flat pattern. The term "tubing" is used here because the neon tube bending trade will surely benefit from this invention. However, other glass bending trades may benefit as well through use of our invention.

The present table 10 has a rigid upright frame 14. The frame can be constructed from various known materials and may be constructed to dimensions appropriate for particular application. The frame 14 shown in the drawings is substantially rectangular, however other configurations may also be used.

The frame 14 is preferably supported by upright support legs 15. The frame 14 includes a peripheral support surface 16 (FIG. 3) that is horizontal and defines a rectangular opening 17. The support surface 16 is formed by horizontal edges of frame members 18 mounted rigidly to the general frame 14. Frame 14 also includes a top surface 19 adjacent each frame end 20. The top surfaces 19 are horizontal and can extend as desired beyond the rectangular opening 17.

A light-transmitting glass plate 23 is mounted to the frame 14, spanning the rectangular opening 17 and overlapping the support surface 16. Plate 23 includes a flat top surface 24 and a parallel bottom surface 25. The flat top surface 24 of plate 23 is held horizontal by the support surface 16. The top surface 24 is resessed slightly below the surfaces 19. The plate 23 may be secured in place by appropriate fasteners or adhesives. To facilitate repair or replacement it preferably rests gravitationally on the support surface 16 without any fixed fasteners.

A pattern holding means 28 is mounted to the frame below the glass plate for releasably receiving and holding the flat pattern 11 in a position adjacent the bottom surface 25 of the glass plate 23. Pattern holding means 28 basically comprises a flat panel 29 movably mounted to the frame between an operative position (solid lines in FIG. 3) wherein pattern 11 is held against the bottom plate surface 25, and an inoperative position (dashed lines in FIG. 3) wherein the lowered panel is spaced clear of the plate and is accessible to allow positioning or removal of a pattern from its upwardly facing planar surface 30. The pattern is apertured to prevent formation of a vacuum when it is to be lowered to the inoperative position.

Preferably the pattern holding means 28 is movably mounted to the frame by a hinge 31. The hinge axis is parallel to the planar surfaces of the plate 23 and arranged so the upper flat surface 30 of panel 29 can be moved into mating engagement against the bottom surface 25 of the plate 23.

A latch means 34 is provided to releasably secure the pattern holding means 28 in the operative position. The latch means 34 may comprise a hook 35 mounted to the pattern holding means 28 and a catch 36 mounted to the frame in the pivotal path of the hook. Various forms of hooks and catches can be used for this purpose.

The panel 29 is held from swinging downwardly past the inoperative position shown in FIG. 3 by a restraining means 38. This means may simply be comprised of a chain or cable connected between the frame 14 and an edge of the panel 29.

A screen means 40 is positioned on the flat top surface of the plate for supporting the heated glass tubing being formed (not shown) and to isolate the heated glass tubing from the plate 23. The screen means 40 is preferably formed of light metal wire screening, such as ordinary metal screen materials used for conventional "screen doors". It is preferred that the screen be metal and that its weave be sufficiently loose to allow the tube bender to clearly see through the screen and plate to the underlying flat pattern 11.

The screen means 40 includes a top surface 41 and a parallel planar bottom surface 42. The surfaces 41 and 42 are spaced apart by the weave of the screen fabric to produce free air space. The dead air within the space serves to isolate the heated glass tubing from the glass plate 23.

The screen means 40 is mounted to a rigid peripheral screen frame 45. The screen frame 45 is preferably hinged at 47 to the frame 14, allowing the screen to be pivoted clear of the glass for cleaning purposes. The hinge axis is parallel to the plate surfaces 24 and 25. Frame 45 is received within a recess on the general frame 14 and its top surface is substantially coplanar with the top frame surface 19.

Operation of the present invention may now be understood with reference to the attached drawings and above technical description.

The tubing bender first selects a pattern that precisely defines the curvature of the tubing he is about to bend. This pattern may be produced or reproduced on ordinary paper. The flat pattern is placed on the holding means 28 by releasing the latch means 34 and allowing the panel 29 to drop to the lowered inoperative position. The pattern is then placed on the upwardly facing surface 30 of the panel and appropriately positioned thereon. The panel is then lifted and the latch means secured to hold the panel in the closed, operative position.

The pattern is held flat against the bottom side of the glass plate 23 in full view of the user beneath the plate and screen means 40.

The tubing bender then selects an appropriate tube, applies heat until it becomes flexible, and then makes appropriate bends similar to those shown by the pattern. The bent tube is rested directly on the screen over the pattern to assure the tube bender that the bends have been properly made. If adjustment is necessary, the tube is reheated, rebent, and repositioned on the screen. These steps are repeated until the tube is formed in accord with the pattern.

The pattern is insulated from the hot tubing both by the glass plate 23 and the air space provided within the screen. The pattern therefore cannot be damaged by heat and can be used repeatedly. Additionally, the heated tube is isolated from the heat absorbing glass plate 23 by the air space provided between surfaces 41 and 42 of the screen. The glass tubing will therefore cool uniformly, avoiding stress checks that normally occur when heated tubing is placed on a cool surface. There is no requirement for the use of asbestos patterns. Operation of the present table is both efficient and safe.

It is pointed out that the above description is given by way of example to set forth a preferred form of the present invention.

Having thus described my invention, what I claim is:

1. A table for supporting and insulating a flat forming pattern from heated glass tubing to be formed according to the pattern, comprising:
   a frame;
   a light transmitting plate mounted to the frame, said plate having a flat top surface and a parallel flat bottom surface;
   pattern holding means mounted to the frame below the plate for releasably receiving and holding the flat pattern adjacent the flat bottom surface of said plate;
   screen means supported on the flat top surface of the plate having a working surface thereon spaced above said flat top plate surface and defining an air space between the working surface and top plate surface;
   wherein said screen means is adapted to support heated glass on its working surface for forming purposes according to a flat pattern viewable on said pattern holding means through the plate and screen means.

2. The table as claimed by claim 1 wherein said frame includes a support surface arranged around an opening formed through the frame and is engaged about the periphery of said light transmitting plate.

3. The table as claimed by claim 1 wherein the pattern holding means is comprised of:
   a panel having a flat pattern receiving surface movably mounted to the frame below said plate;
   said panel being movable between an inoperative pattern receiving position clear of said light transmitting plate and an operative pattern supporting position in mating engagement against the flat bottom surface of said plate.

4. The table as claimed by claim 3 further comprising:
   latch means between said pattern holding means and said frame for releasably holding said panel in its operative position.

5. The table as defined by claim 4 wherein said panel is hinged to said frame about an axis parallel to the flat bottom surface of said light transmitting plate.

6. The table as defined by claim 3 wherein said panel is hinged to said frame about an axis parallel to the flat bottom surface of said light transmitting plate.

7. The table as claimed by claim 1 wherein said screen means comprises:
   a metal woven screen; and
   a peripheral screen frame mounting said screen in a flat, planar orientation, said screen frame being received upon said frame with said woven screen overlapping the top surface of said light transmitting plate.

8. A table as claimed by claim 7 wherein said screen means is hinged to said frame for pivotal movement about a hinge axis parallel to the flat top surface of said light transmitting plate.

9. A table as claimed by claim 1 wherein said screen means is hinged to said frame for pivotal movement about a hinge axis parallel to the flat top surface of said light transmitting plate.

10. A table as claimed by claim 1 wherein:
    said pattern holding means is hinged to said frame about a hinge axis parallel to the bottom surface of said light transmitting plate and is movable thereon between an operative position in engagement with the bottom surface of said light transmitting plate, and an inoperative position clear of said plate;
    and further comprising:
    restraining means operatively connecting the pattern holding means and frame for preventing motion of the pattern holding means relative to the frame beyond its inoperative position.

* * * * *